United States Patent
Janarthanam et al.

(10) Patent No.: US 11,332,027 B2
(45) Date of Patent: May 17, 2022

(54) MANUAL RELEASE SYSTEMS FOR ELECTRIFIED VEHICLE CHARGE PORT LOCKS

(71) Applicant: FORD GLOBAL TECHNOLOGIES, LLC, Dearborn, MI (US)

(72) Inventors: Suriyaprakash Ayyangar Janarthanam, Canton, MI (US); Leslie James Lindeman, Dearborn, MI (US); Daniel Miller, Dearborn, MI (US); John Marshall Penney, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/851,318

(22) Filed: Apr. 17, 2020

(65) Prior Publication Data

US 2021/0323421 A1 Oct. 21, 2021

(51) Int. Cl.
| | |
|---|---|
| *B60L 53/16* | (2019.01) |
| *E05B 83/34* | (2014.01) |
| *E05B 73/00* | (2006.01) |
| *H01R 13/639* | (2006.01) |
| *B60K 6/28* | (2007.10) |

(52) U.S. Cl.
CPC ............. *B60L 53/16* (2019.02); *E05B 73/00* (2013.01); *E05B 83/34* (2013.01); *H01R 13/639* (2013.01); *B60K 6/28* (2013.01); *B60Y 2200/91* (2013.01); *B60Y 2200/92* (2013.01); *E05Y 2900/534* (2013.01); *H01R 2201/26* (2013.01)

(58) Field of Classification Search
CPC .............. H01R 13/639; H01R 2201/26; B60Y 2200/91; B60Y 2200/92; E05Y 2900/534; E05B 73/00; B60L 53/16
See application file for complete search history.

(56) References Cited

U.S. PATENT DOCUMENTS

| | | | |
|---|---|---|---|
| 5,627,448 A | 5/1997 | Okada et al. | |
| 8,172,599 B2 | 5/2012 | Konchan | |
| 8,550,833 B2 * | 10/2013 | Martin | ..... B60L 53/16 439/310 |
| 8,690,591 B2 | 4/2014 | Charnesky et al. | |
| 9,776,521 B2 | 10/2017 | Lopez et al. | |
| 9,950,635 B1 * | 4/2018 | Trego | ..... H01R 13/6275 |
| 10,625,623 B2 * | 4/2020 | Lyon | ..... B60L 53/16 |
| 10,763,618 B2 * | 9/2020 | Park | ..... B60L 53/16 |
| 10,941,593 B2 * | 3/2021 | Krishnan | ..... E05B 79/20 |

(Continued)

FOREIGN PATENT DOCUMENTS

| | | |
|---|---|---|
| DE | 10 2013 222 509 A | 5/2015 |
| JP | 2017212133 A | 11/2017 |
| WO | 2014/005562 A1 | 1/2014 |

*Primary Examiner* — Oscar C Jimenez
(74) *Attorney, Agent, or Firm* — David B. Kelley; Carlson, Gaskey & Olds, P.C.

(57) ABSTRACT

This disclosure describes manual release systems for electrified vehicle charge port locks. In some embodiments, a vehicle key may be used to manually override a position of the charge port lock. In other embodiments, a pull button and cable arrangement may be used to manually override the position of the charge port lock. The pull button may be packaged under a vehicle hood and, in some embodiments, may be mounted to either a cooling system component or a grille support structure.

15 Claims, 6 Drawing Sheets

(56) References Cited

U.S. PATENT DOCUMENTS

| | | | |
|---|---|---|---|
| 2012/0313580 A1* | 12/2012 | Charnesky | H01R 13/6397 |
| | | | 320/109 |
| 2013/0047687 A1* | 2/2013 | Kurumizawa | B60L 53/16 |
| | | | 70/490 |
| 2014/0169865 A1* | 6/2014 | Kurumizawa | B60L 3/04 |
| | | | 403/322.1 |
| 2014/0170889 A1* | 6/2014 | Kahara | H01R 13/6397 |
| | | | 439/352 |
| 2020/0207226 A1* | 7/2020 | Sasaki | B60L 53/16 |

* cited by examiner

MANUAL RELEASE SYSTEMS FOR ELECTRIFIED VEHICLE CHARGE PORT LOCKS

TECHNICAL FIELD

This disclosure relates to electrified vehicles, and more particularly to manual release systems for electrified vehicle charge port locks.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

Charging a battery pack of an electrified vehicle, such as a plug-in hybrid electric vehicle (PHEV) or battery electric vehicle (BEV), can involve electrically coupling the vehicle to an external power source. A charge port of the electrified vehicle is configured to receive a connector/coupler of a charge cord (e.g., an electric vehicle supply equipment (EVSE)) that is electrically coupled to the external power source. Some charge ports include a lock configured to lock the charge cord connector to the charge port to prevent theft of the charge cord and unintended separation of the charging circuits while the vehicle is charging.

SUMMARY

An electrified vehicle according to an exemplary aspect of the present disclosure includes, among other things, an under-hood mounted component, a charge port assembly including a lock having an actuator, a pull button mounted to the under-hood mounted component, and a cable operably connected to each of the pull button and the actuator.

In a further non-limiting embodiment of the foregoing electrified vehicle, the actuator is configured to move a pin of the lock between a locked position and a released position when the lock is in a normal operating condition. The pull button and the cable are configured to manually move the pin to the released position when the lock is in a stuck on plug condition.

In a further non-limiting embodiment of either of the foregoing electrified vehicles, the under-hood mounted component is mounted within an engine compartment under a hood of the electrified vehicle.

In a further non-limiting embodiment of any of the foregoing electrified vehicles, the under-hood mounted component is a coolant tank.

In a further non-limiting embodiment of any of the foregoing electrified vehicles, the pull button is movable between a first position and a second position to override a locked position of the actuator.

In a further non-limiting embodiment of any of the foregoing electrified vehicles, the cable is relaxed when the pull button is in the first position and the cable is taut when the pull button is in the second position. The cable is operably connected to the actuator through a lever or a linkage.

In a further non-limiting embodiment of any of the foregoing electrified vehicles, the pull button is mounted under a hood of the electrified vehicle.

In a further non-limiting embodiment of any of the foregoing electrified vehicles, the pull button is mounted to the under-hood mounted component by a mounting bracket.

An electrified vehicle according to another exemplary aspect of the present disclosure includes, among other things, a grille assembly, a charge port assembly mounted to the grille assembly and including a lock having an actuator, a pull button mounted to a grille support structure of the grille assembly, and a cable operably connected to each of the pull button and the actuator.

In a further non-limiting embodiment of the foregoing electrified vehicle, the pull button is movable between a first position and a second position to override a locked position of the actuator. The cable is relaxed when the pull button is in the first position and the cable is taut when the pull button is in the second position.

In a further non-limiting embodiment of either of the foregoing electrified vehicles, the cable is operably connected to the actuator through a lever or a linkage.

In a further non-limiting embodiment of any of the foregoing electrified vehicles, the pull button is mounted under a hood of the electrified vehicle.

In a further non-limiting embodiment of any of the foregoing electrified vehicles, the pull button is mounted to the grille support structure by a mounting bracket.

In a further non-limiting embodiment of any of the foregoing electrified vehicles, the actuator is configured to move a pin of the lock between a locked position and a released position when the lock is in a normal operating condition. The pull button and the cable are configured to manually move the pin to the released position when the lock is in a stuck on plug condition.

An electrified vehicle according to another exemplary aspect of the present disclosure includes, among other things, a charge port assembly including a lock having an actuator and a key slot provided within the charge port assembly and configured to receive a barrel of a vehicle key for manually overriding a position of the lock.

In a further non-limiting embodiment of the foregoing electrified vehicle, the key slot is formed in a housing of the charge port assembly.

In a further non-limiting embodiment of either of the foregoing electrified vehicles, the key slot is formed in a key barrel that is mounted within a housing of the charge port assembly.

In a further non-limiting embodiment of any of the foregoing electrified vehicles, the key slot is formed in a cover plate assembly of the charge port assembly.

In a further non-limiting embodiment of any of the foregoing electrified vehicles, a pull button is disposed beneath the cover plate assembly. The pull button is operably connected to the actuator.

In a further non-limiting embodiment of any of the foregoing electrified vehicles, the pull button is movably mounted to a housing of the charge port assembly or a surface of a wheel well of the electrified vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes manual release systems for electrified vehicle charge port locks. In some embodiments, a vehicle key may be used to manually override a position of the charge port lock. In other embodiments, a pull button and cable arrangement may be used to manually override the position of the charge port lock. The pull button may be packaged under a vehicle hood and, in some embodiments, may be mounted to either a cooling system component or a grille support structure. These and other features of this disclosure are discussed in greater detail in the following paragraphs of this detailed description.

Figure 1:
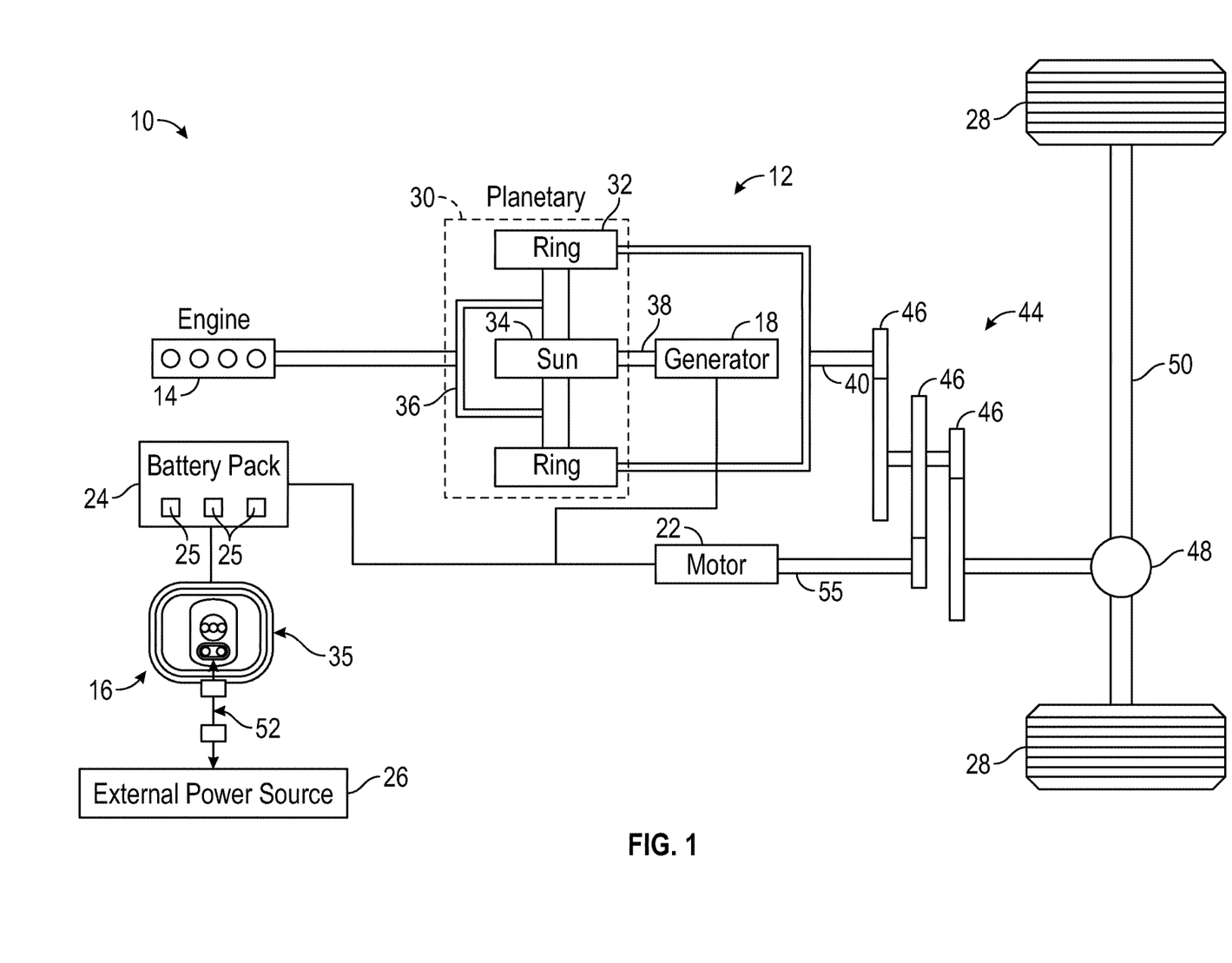
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 may employ two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 may also equipped with a charging system 16 for charging the energy storage devices (e.g., battery cells) of the battery pack 24. The charging system 16 may include charging components that are located both onboard the electrified vehicle 12 and external to the electrified vehicle 12. The charging system 16 is connectable to one or more external power sources 26 (e.g., utility/grid power from an electrical grid) for receiving and distributing power throughout the electrified vehicle 12.

In an embodiment, the charging system 16 includes a charge port assembly 35 (sometimes referred to as a vehicle inlet assembly) located on-board the electrified vehicle 12, and a charge cord assembly 52 (sometimes referred to as an electric vehicle supply equipment (EVSE) assembly) that can be operably connected between the charge port assembly 35 and the external power source 26. The charge port assembly 35 may include one or more ports adapted to receive a connector (sometimes referred to as a coupler or plug) of the charge cord assembly 52. The charge port assembly 35 is therefore configured to receive power from the external power source 26 and then supply the power to the battery pack 24 for charging the battery cells contained therein.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.). The charging system 16 may be configured to provide any level of charging (e.g., level 1, 2, DC, etc.).

The powertrain 10 of FIG. 1 is highly schematic and is not intended to limit this disclosure. Various additional components could alternatively or additionally be employed by the powertrain 10 within the scope of this disclosure.

Figure 2:
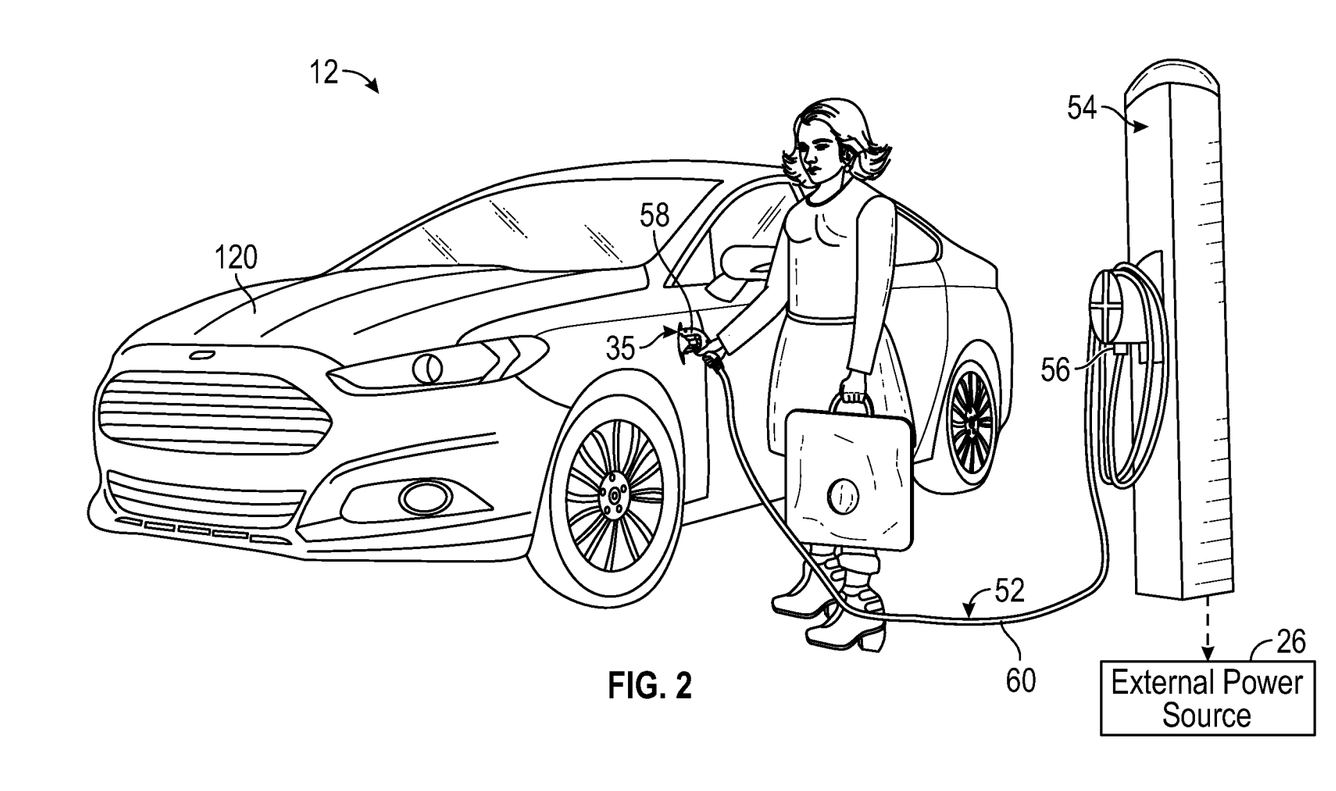
FIG. 2 schematically illustrates an electrified vehicle while being charged at a charging station.

FIG. 2 schematically illustrates an electrified vehicle 12 parked near a charging station 54 for charging. The electrified vehicle 12 may employ the powertrain 10 of FIG. 1, or any other electrified powertrain in which electric drive components are configured to electrically propel the wheels of the electrified vehicle 12, either with or without the assistance of an engine.

The charging station 54 is powered by the external power source 26. In an embodiment, the external power source 26 includes utility grid power. In another embodiment, the external power source 26 includes an alternative energy source, such as solar power, wind power, etc. In yet another embodiment, the external power source 26 includes a combination of utility grid power and alternative energy sources.

The charge cord assembly 52 (or a tethered cord set of the charging station 54) may be connected to both the charging station 54 (or a wall outlet) and the charge port assembly 35 for conveying power form the external power source 26 to the electrified vehicle 12. In an embodiment, the charge cord assembly 52 includes a plug 56 for connecting to the charging station 54 (or a wall outlet), a connector 58 (sometimes referred to as a coupler) for connecting to the charge port assembly 35 of the electrified vehicle 12, and a charger cable 60 extending between the plug 56 and the connector 58. Power originating from the external power source 26 may be transferred from the charging station 54 to the charge port assembly 35 for charging the battery pack 24 of the electrified vehicle 12 via the charger cable 60 and the connector 58. The power received by the charge port assembly 35 may be transferred to an on-board charger module and then over high voltage cables to the battery pack 24 for replenishing the energy of the battery cells housed within the battery pack 24.

It is sometimes desirable to lock the connector 58 to the charge port assembly 35 during charging to both prevent theft of the charge cord assembly 52 and the unintended separation of the connector 58 from the charge port assembly 35. In some geographic regions, regulations may even require that the connector 58 locks to the charge port assembly 35 during charging.

Figure 3:
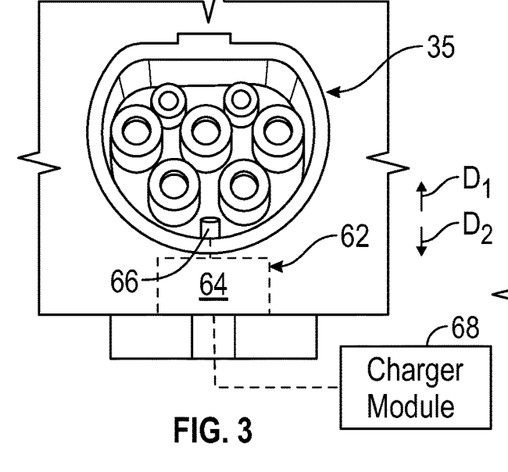
FIG. 3 illustrates an exemplary charge port assembly of the electrified vehicle of FIG. 2.

Referring to FIG. 3, the charge port assembly 35 may include a lock 62 configured to selectively lock the connector 58 to the charge port assembly 35. The lock 62 may include an actuator 64, which is illustrated schematically. The actuator 64 is configured to move a pin 66 in directions D1 and D2 between a locked position and a released position when the lock 62 operates under normal operating conditions. For example, the pin 66 may be moved in the direction D1 to position the pin 66 within a corresponding recess of the connector 58, thereby locking the connector 58 to the charge port assembly 35. In the released position, the actuator 64 is configured to move the pin 66 in the direction D2 to remove the pin 66 from the recess of the connector 58, thereby enabling a user to detach the connector 58 from the charge port assembly 35. The actuator 64 may be programmed to move the pin 66 between the locked and released positions in response to electrical signals received from an on-board charger module 68. The actuator 64 is therefore responsive to commands and instructions from the charger module 68.

While only one pin 66 is illustrated, it should be understood that the lock 62 could include additional pins for locking the connector 58 to the charge port assembly 35. Further, this disclosure is not limited to the particular location of the pin 66 shown in FIG. 3. The lock 62 could include pins placed elsewhere around the charge port assembly 35.

Moreover, while the actuator 64 is illustrated schematically in FIG. 3, it should be understood that this disclosure extends to all types of actuators. The actuator 64, for example, may include a motor and one or more gears and links, and can be responsive to instructions from the charger module 68, which may itself be in electrical communication with other controllers, such as a vehicle system controller (VSC), for example.

In some scenarios, such as during electrical signal faults or communication faults, the lock 62 may become stuck in the locked position, which is sometimes referred to as the vehicle being "stuck on plug." In the "stuck on plug" condition, the actuator 64 is at least momentarily incapable of moving the pin 66 in the direction D2 to the released position, thereby at least temporarily preventing the user from removing the connector 58 from the charge port assembly 35. This disclosure therefore proposes manual release systems for allowing the user to manually release the lock 62 of the charge port assembly 35.

Figure 4:
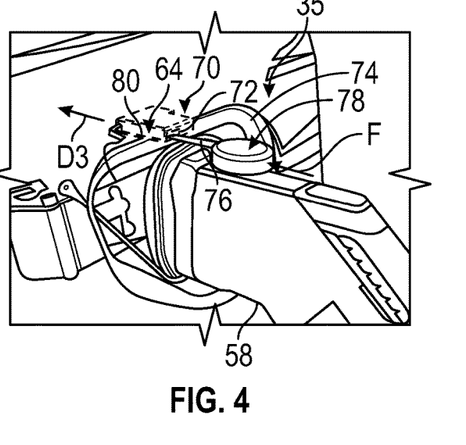
FIG. 4 illustrates an exemplary manual release system of a vehicle charge port assembly.

FIG. 4, with continued reference to FIGS. 1-3, illustrates a manual release system 70 according to a first embodiment of this disclosure. The exemplary manual release system 70 may include a key slot 72 formed in a housing 74 of the charge port assembly 35. The key slot 72 may be keyed to match the design (e.g., in terms of a series of teeth/notches) of a blade 76 of a vehicle key 78 associated with the electrified vehicle 12. The key slot 72 and the blade 76 may include any configurations so long as the configurations match one another.

When the blade 76 of the vehicle key 78 is fully inserted into the key slot 72, the blade 76 may push a lever 80 of the manual release system 70. The lever 80 is operably connected to the actuator 64 of the lock 62 such that movement of the lever 80 overrides the locked position of the actuator 64. For example, movement of the lever 80 in a direction D3, via an insertion force F of the blade 76 of the vehicle key 78, moves the pin 66 of the lock 62 in the direction D2 (see FIG. 3) to unlock the connector 58 from the charge port assembly 35. The user may then remove the connector 58 from the charge port assembly 35.

Figure 5:
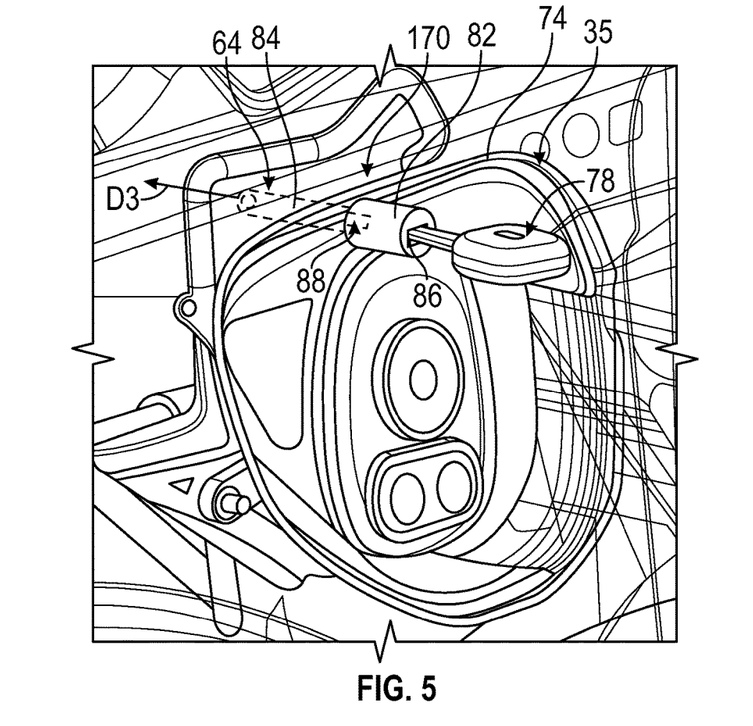
FIG. 5 illustrates another exemplary manual release system of a vehicle charge port assembly.

FIG. 5 illustrates a manual release system 170 according to a second embodiment of this disclosure. The manual release system 170 may include a key barrel 82 and a lever 84. The key barrel 82 may be mounted within the housing 74 of the charge port assembly 35, and the lever 84 may be operably connected to the actuator 64 of the lock 62.

The key barrel 82 may include a key slot 86 that is keyed to match a design of a blade 76 of a vehicle key 78 associated with the electrified vehicle 12. When the blade 76 is fully inserted into the key slot 86, the blade 76 may actuate a push pin 88 of the key barrel 82 that then pushes against the lever 84, thereby overriding the locked position of the actuator 64. For example, movement of the lever 84 in a direction D3 moves the pin 66 of the lock 62 in the direction D2 (see FIG. 3) to unlock the connector 58 from the charge port assembly 35. The user may then remove the connector 58 from the charge port assembly 35.

Figure 6A:
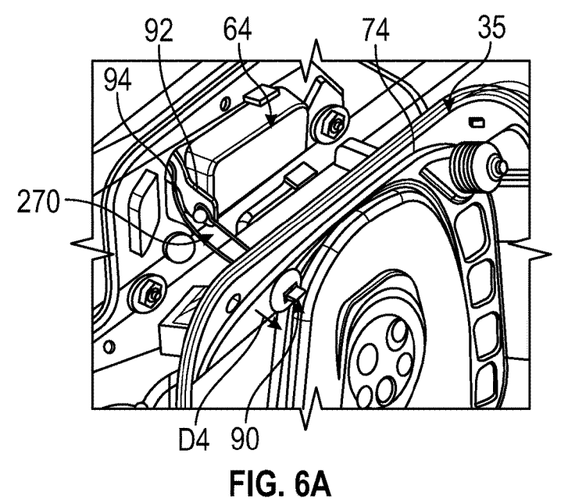
FIGS. 6A and 6B illustrate another exemplary manual release system of a vehicle charge port assembly.
Figure 6B:
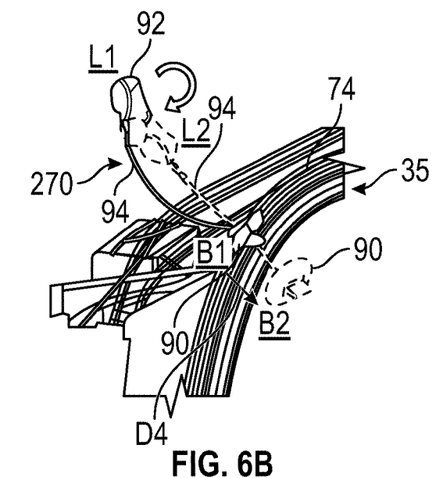
Figure 7:
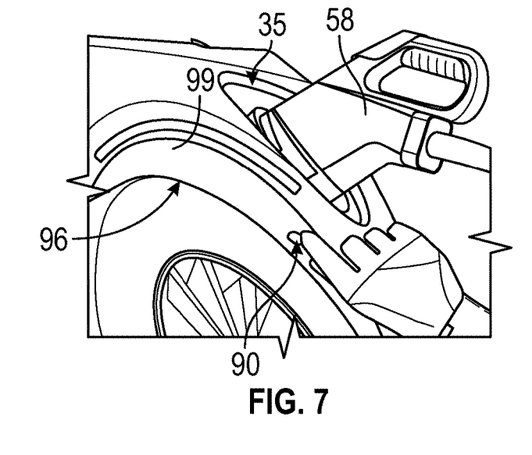
FIG. 7 illustrates an alternative packaging location for a pull button of the manual release system of FIGS. 6A and 6B.

FIGS. 6A and 6B illustrate a manual release system 270 according to another embodiment of this disclosure. The manual release system 270 may include a pull button 90, a lever 92, and a cable 94 that is connected at it opposite ends to both the pull button 90 and the lever 92. In an embodiment, the pull button 90 is movably mounted relative to the housing 74 of the charge port assembly 35. In another embodiment, the pull button 90 is movably mounted to a surface 99 of a wheel well 96 of the electrified vehicle 12 (see FIG. 7).

The pull button 90 may be pulled outwardly in a direction D4 away from the housing 74 (or the surface 99 of the wheel well 96) between a first position B1 and a second position B2 (see FIG. 6B). In the first position B1, the cable 94 is relaxed, and in the second position B2, the cable 94 is tensioned to a relatively taut condition. The second position B2 of the pull button 90, and the resulting position of the cable 94, is shown in phantom in FIG. 6B.

Movement of the pull button 90 between the first and second positions B1, B2 may rotate the lever 92, which may be operatively connected to the actuator 64, between a first position L1 and a second position L2 (see FIG. 6B). Movement of the pull button 90 to the second position B2 and the lever 92 to the second position L2 moves the pin 66 of the lock 62 in the direction D2 (see FIG. 3) to unlock the connector 58 from the charge port assembly 35. The user may then remove the connector 58 from the charge port assembly 35. The pull button 90, the lever 92, and the cable 94 are shown using phantom lines in FIG. 6B to schematically illustrate their actuated positions.

Figure 8:
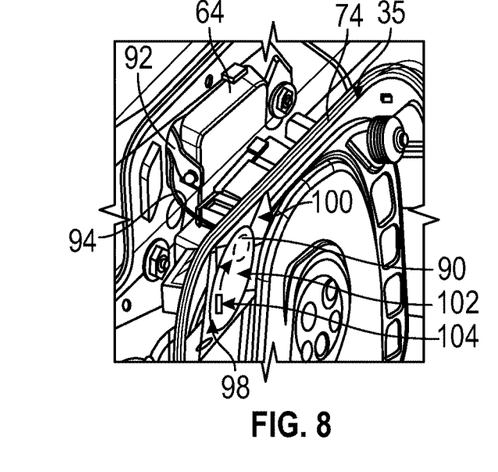
FIG. 8 illustrates a cover assembly of the manual release system of FIGS. 6A and 6B.

Referring now to FIG. 8, the manual release system 270 of FIGS. 6A and 6B may additionally include a cover plate assembly 98. The cover plate assembly 98 may selectively cover or otherwise conceal the pull button 90 to prevent unauthorized use of the manual release system 270. The cover plate assembly 98 is shown mounted to the housing 74 of the charge port assembly 35 in FIG. 8. A similar cover plate assembly could be mounted to the surface 99 of the wheel well 96 for embodiments in which the pull button 90 is mounted to the surface 99.

In an embodiment, the cover plate assembly 98 includes a base plate 100 and a cover plate 102. The base plate 100 may be fixedly mounted to the housing 74, and the cover plate 102 may be rotatably received by the base plate 100. The cover plate 102 may include a key slot 104 configured to receive a vehicle key. The vehicle key may be inserted into the key slot 104, and the cover plate 102 may then be moved to a rotated position that exposes the pull button 90. The user may then access and actuate the pull button 90 through the key slot 104 in order to release the connector 58 from the charge port assembly 35.

Figure 9:
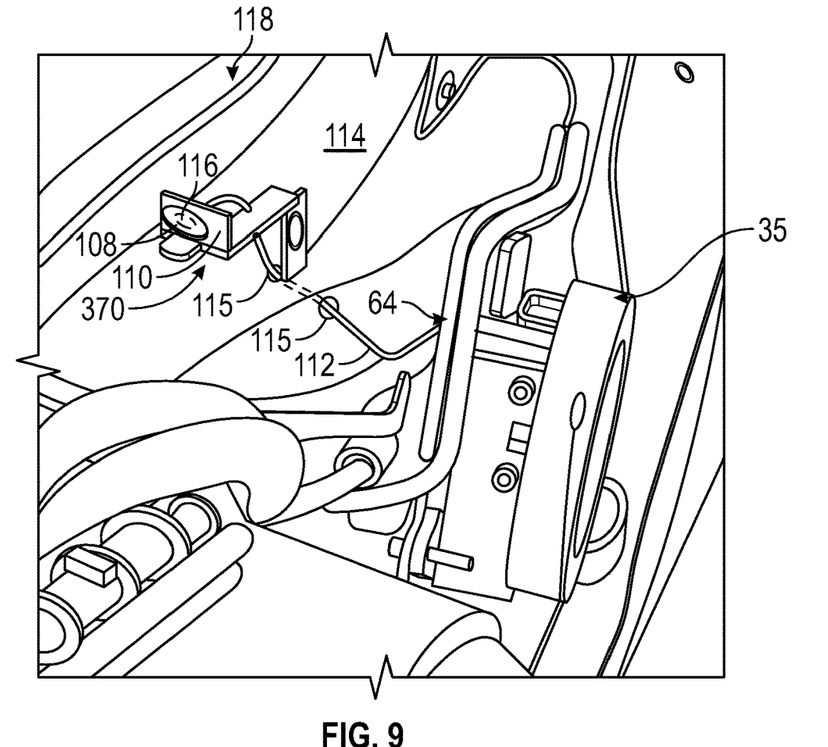
FIG. 9 illustrates another exemplary manual release system of a vehicle charge port assembly.

FIG. 9 illustrates another a manual release system 370 according to another embodiment of this disclosure. The manual release system 370 may include a pull button 108, a mounting bracket 110, and a cable 112 that is connected between the pull button 108 and the actuator 64 of the charge port assembly 35. The mounting bracket 110 may be mounted directly to a body panel 114 of the electrified vehicle 12 and may include an opening 116 or other feature for receiving and retaining the pull button 108.

In embodiment, the body panel 114 establishes portions of an engine compartment 118 of the electrified vehicle 12. Therefore, in this embodiment, the pull button 108 is packaged beneath a hood 120 (see FIG. 2) of the electrified vehicle 12. In an embodiment, the cable 112 may be routed through one or more openings 115 formed through the body panel 114.

The pull button 108 may be accessed from within the engine compartment 118 when the hood 120 is open. The pull button 108 may be pulled outwardly in a direction away from the mounting bracket 110. Pulling the pull button 108 applies tension on the cable 112, thereby transitioning the cable 112 from a relaxed position to a taut position. The cable 112 may be operably connected to the actuator 64 such that the tension on the cable 112 is configured to manually override the locked position of the actuator 64. For example, tensioning the cable 112 may result in moving the pin 66 of the lock 62 in the direction D2 (see FIG. 3) to unlock the connector 58 from the charge port assembly 35. The user may then remove the connector 58 from the charge port assembly 35.

Figure 10:
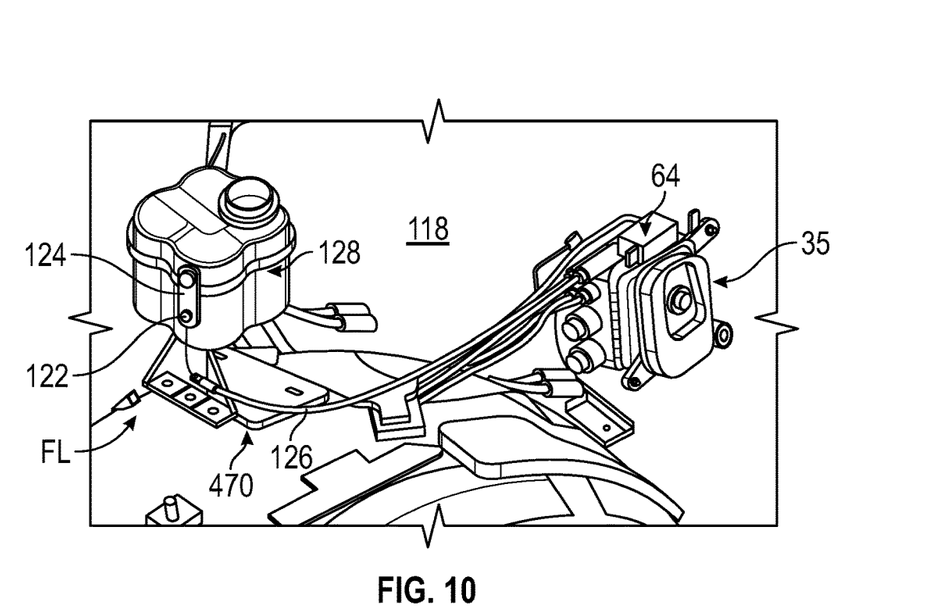
FIG. 10 illustrates another exemplary manual release system of a vehicle charge port assembly.

FIG. 10 illustrates a manual release system 470 according to yet another embodiment of this disclosure. The manual release system 470 may include a pull button 122, a mounting bracket 124, and a cable 126 that is connected between the pull button 122 and the actuator 64 of the charge port assembly 35. The mounting bracket 124 may be mounted directly to a cooling system component 128 of the electrified vehicle 12. In embodiment, the cooling system component 128 is a coolant tank that is mounted within an engine compartment 118 of the electrified vehicle 12. Therefore, in this embodiment, the pull button 122 is packaged beneath a hood 120 (see FIG. 2) of the electrified vehicle 12.

The pull button 122 may be packaged at a forward location FL of the engine compartment 118. In an embodiment, the forward location FL is displaced forward from a dash panel/firewall of the engine compartment 118.

The pull button 122 may be accessed from within the engine compartment 118 when the hood 120 is open. The pull button 122 may be pulled outwardly in a direction away from the mounting bracket 124. Pulling the pull button 122 applies tension on the cable 126, thereby transitioning the cable 126 from a relaxed position to a taut position. The cable 126 may be operably connected to the actuator 64 such that the tension on the cable 126 overrides the locked position of the actuator 64. For example, tensioning the cable 126 may result in moving the pin 66 of the lock 62 in the direction D2 (see FIG. 3) to unlock the connector 58 from the charge port assembly 35. The user may then remove the connector 58 from the charge port assembly 35.

Figure 11:
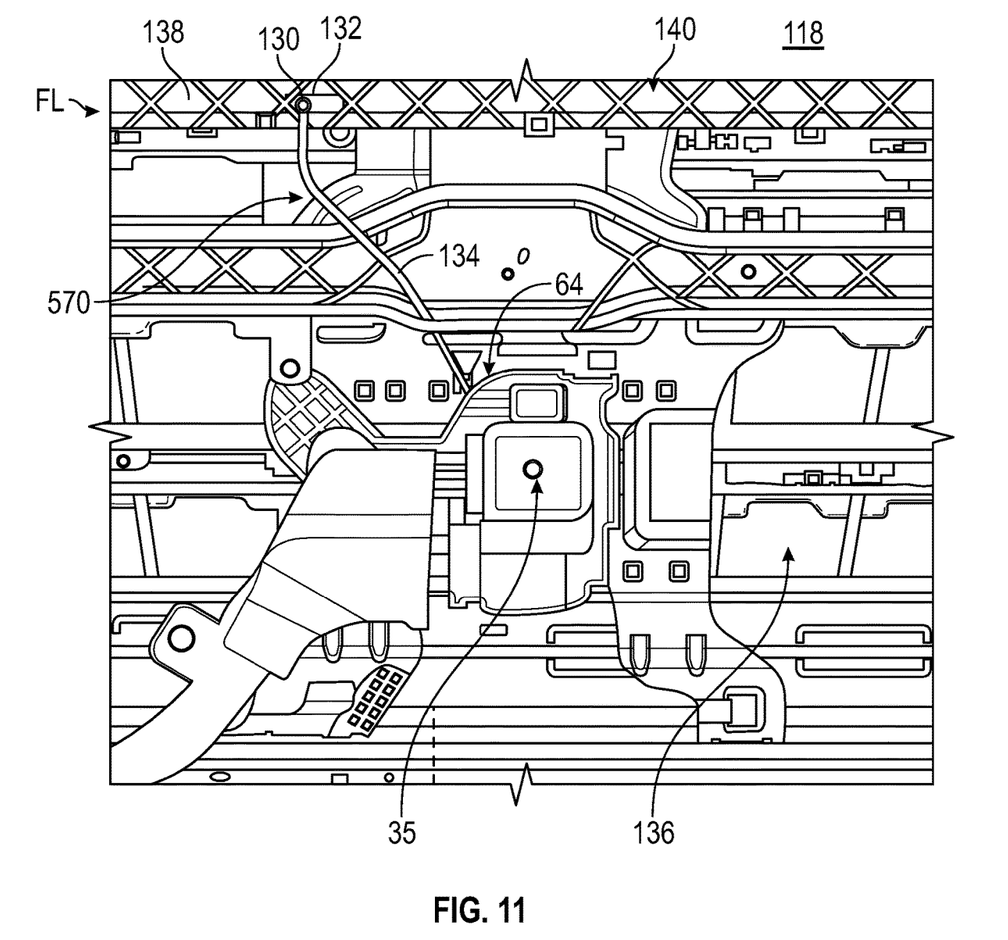
FIG. 11 illustrates yet another exemplary manual release system of a vehicle charge port assembly.

FIG. 11 illustrates a manual release system 570 according to yet another embodiment of this disclosure. The manual release system 570 may include a pull button 130, a mounting bracket 132, and a cable 134 that is connected between the pull button 130 and the actuator 64 of the charge port assembly 35. The cable 134 may be operably connected to the actuator 64 through one or more levers or linkages.

In this embodiment, the charge port assembly 35 is mounted at a front side of a grille assembly 136 of the electrified vehicle 12. The mounting bracket 132 may be mounted directly to an upper surface 138 of a grille support structure 140. The grille support structure 140 is mounted within an engine compartment 118 of the electrified vehicle 12. Therefore, in this embodiment, the pull button 130 is packaged beneath a hood 120 (see FIG. 2) of the electrified vehicle 12.

The pull button 130 may be packaged at a forward location FL of the engine compartment 118. In an embodiment, the forward location FL is displaced forward from a dash panel/firewall of the engine compartment 118.

The pull button 130 may be accessed from within the engine compartment 118 when the hood 120 is open. The pull button 130 may be pulled outwardly in a direction away from the mounting bracket 132. Pulling the pull button 130 applies tension on the cable 134, thereby transitioning the cable 134 from a relaxed position to a taut position. The cable 134 may be operably connected to the actuator 64 such that the tension on the cable 134 overrides the locked position of the actuator 64. For example, tensioning the cable 134 may result in moving the pin 66 of the lock 62 in the direction D2 (see FIG. 3) to unlock the connector 58 from the charge port assembly 35. The user may then remove the connector 58 from the charge port assembly 35.

The charge port assemblies of this disclosure incorporate manual release systems for manually releasing a charge cord connector from the vehicle charge port assembly, such as during electrical signal faults or communication faults. The exemplary manual release systems of this disclosure provide relatively simple and cost effective solutions for releasing the change cord connector from a locked condition without requiring special tools.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   an under-hood mounted component;
   a charge port assembly including a lock having an actuator;
   a pull button mounted to the under-hood mounted component; and
   a cable operably connected to each of the pull button and the actuator, wherein the cable is routed through at least two openings formed through a body panel of the electrified vehicle.

2. The electrified vehicle as recited in claim 1, wherein the actuator is configured to move a pin of the lock between a locked position and a released position when the lock is in a normal operating condition, and further wherein the pull button and the cable are configured to manually move the pin to the released position when the lock is in a stuck on plug condition.

3. The electrified vehicle as recited in claim 1, wherein the under-hood mounted component is mounted within an engine compartment under a hood of the electrified vehicle.

4. The electrified vehicle as recited in claim 3, wherein the under-hood mounted component is a coolant tank.

5. The electrified vehicle as recited in claim 1, wherein the pull button is movable between a first position and a second position to override a locked position of the actuator, and further wherein the cable is relaxed when the pull button is in the first position and the cable is taut when the pull button is in the second position, and further wherein the cable is operably connected to the actuator through a lever or a linkage.

6. The electrified vehicle as recited in claim 1, wherein the pull button is mounted under a hood of the electrified vehicle.

7. The electrified vehicle as recited in claim 1, wherein the pull button is mounted to the under-hood mounted component by a mounting bracket.

8. An electrified vehicle, comprising:
   a grille assembly;
   a charge port assembly mounted to the grille assembly and including a lock having an actuator;
   a pull button mounted to a grille support structure of the grille assembly; and
   a cable operably connected to each of the pull button and the actuator,
   wherein the pull button is mounted under a hood of the electrified vehicle and is mounted to the grille support structure by a mounting bracket,
   wherein the mounting bracket is mounted directly to an upper surface of the grille support structure, and the charge port assembly is mounted at a front side of the grill assembly, and the pull button is packaged at a forward location of an engine compartment and is displaced forward from a dash panel/firewall of the engine compartment.

9. The electrified vehicle as recited in claim 8, wherein the pull button is movable between a first position and a second position to override a locked position of the actuator, and further wherein the cable is relaxed when the pull button is in the first position and the cable is taut when the pull button is in the second position.

10. The electrified vehicle as recited in claim 8, wherein the cable is operably connected to the actuator through a lever or a linkage.

11. The electrified vehicle as recited in claim 8, wherein the actuator is configured to move a pin of the lock between a locked position and a released position when the lock is in a normal operating condition, and further wherein the pull button and the cable are configured to manually move the pin to the released position when the lock is in a stuck on plug condition.

12. An electrified vehicle, comprising:
   a charge port assembly including a lock having an actuator;
   a key slot provided within the charge port assembly and configured to receive a blade of a vehicle key for manually overriding a position of the lock,
   wherein the key slot is formed in a cover plate assembly of the charge port assembly; and
   a pull button disposed beneath the cover plate assembly, wherein the pull button is operably connected to the actuator, and further wherein the pull button is movably mounted to a housing of the charge port assembly or a surface of a wheel well of the electrified vehicle.

13. The electrified vehicle as recited in claim 12, wherein the key slot is formed in a housing of the charge port assembly.

14. The electrified vehicle as recited in claim 12, wherein the key slot is formed in a key barrel that is mounted within a housing of the charge port assembly.

15. The electrified vehicle as recited in claim 12, wherein the key slot is keyed to match a teeth/notch configuration of the blade of the vehicle key.

* * * * *